United States Patent
Jian

(10) Patent No.: US 11,747,574 B2
(45) Date of Patent: Sep. 5, 2023

(54) MICROFABRICATION METHOD FOR OPTICAL COMPONENTS

(71) Applicant: Ningbo Litas Optical Technologies Co. Ltd., Ningbo (CN)

(72) Inventor: Benjamin B. Jian, Sunnyvale, CA (US)

(73) Assignee: Ningo Litas Optical Technologies Co. Ltd., Ningbo (CN)

( * ) Notice: Subject to any disclaimer, the term of this patent is extended or adjusted under 35 U.S.C. 154(b) by 0 days.

(21) Appl. No.: 17/232,166

(22) Filed: Apr. 16, 2021

(65) Prior Publication Data
US 2021/0231883 A1 Jul. 29, 2021

Related U.S. Application Data

(60) Division of application No. 16/656,539, filed on Oct. 17, 2019, now Pat. No. 10,983,288, which is a (Continued)

(51) Int. Cl.
*G02B 6/38* (2006.01)

(52) U.S. Cl.
CPC ......... *G02B 6/3865* (2013.01); *G02B 6/3818* (2013.01); *G02B 6/3847* (2013.01); *G02B 6/3861* (2013.01); *G02B 6/3863* (2013.01); *G02B 6/3882* (2013.01); *G02B 6/3885* (2013.01)

(58) Field of Classification Search
CPC .. G02B 6/3865; G02B 6/3818; G02B 6/3847; G02B 6/3861; G02B 6/3863; G02B 6/3882; G02B 6/3885
See application file for complete search history.

(56) References Cited

U.S. PATENT DOCUMENTS 7,258,495 B1 * 8/2007 Hughes, Jr. .......... G02B 6/4292
385/38
2002/0097956 A1 * 7/2002 Kikuchi ................. G02B 6/327
385/33

(Continued)

FOREIGN PATENT DOCUMENTS

JP 09015444 A * 1/1997

*Primary Examiner* — Sung H Pak
*Assistant Examiner* — Hoang Q Tran
(74) *Attorney, Agent, or Firm* — Idea Intellectual Limited; Margaret A. Burke; Sam T. Yip

(57) ABSTRACT

A ferrule mold having a reverse-image of a through-hole array for optical fibers is formed. A non-polymeric ferrule material is deposited in the reverse-image mold, followed by removing the mold to create a multi-fiber connector ferrule having at least two fiber through-holes. An optical fiber is inserted in each through-hole until each fiber endface is positioned approximately even with a connection surface of the ferrule. A fiber recess for each of the optical fibers is formed such that each fiber is recessed from the multi-fiber ferrule connection surface by a distance of at least 0.1 micron. The recess may be formed by differential polishing of the non-polymeric ferrule and endfaces of the optical fibers. Alternatively, a layer of spacer material may be deposited over the multi-fiber ferrule connection surface. An antireflection coating is deposited over the ferrule connection surface and ends of the recessed fibers.

8 Claims, 14 Drawing Sheets

Related U.S. Application Data continuation of application No. 16/505,673, filed on Jul. 8, 2019, now Pat. No. 10,545,294, and a continuation of application No. 13/725,087, filed on Dec. 21, 2012, now abandoned.

(60) Provisional application No. 61/579,017, filed on Dec. 22, 2011.

(56) References Cited

U.S. PATENT DOCUMENTS

| | | | | |
|---|---|---|---|---|
| 2008/0019642 | A1* | 1/2008 | Kewitsch | G02B 6/3825 385/72 |
| 2009/0324176 | A1* | 12/2009 | Cheng | G02B 6/3885 385/73 |
| 2010/0278491 | A1* | 11/2010 | Noddings | G02B 6/443 385/100 |
| 2013/0122252 | A1* | 5/2013 | Ode | G02B 1/113 428/141 |

* cited by examiner

MICROFABRICATION METHOD FOR OPTICAL COMPONENTS

CROSS-REFERENCE TO RELATED APPLICATIONS

This application is a divisional of U.S. patent application Ser. No. 16/656,539 which claims priority from U.S. patent application Ser. No. 16/505,673, filed Jul. 8, 2019, U.S. patent application Ser. No. 13/725,087, filed Dec. 21, 2012, and Provisional Application Ser. No. 61/579,017, entitled "Non-Contact Optical Fiber Connector", and filed on Dec. 22, 2011, the disclosures of which are incorporated by reference herein.

FIELD OF THE INVENTION

The present invention relates to a microfabrication method using a microfabrication mold, material deposition, material removal, etching, and coating to create an optical component such as a multi-fiber optical fiber connector.

BACKGROUND

Multi-fiber optical connectors are widely used by telecommunication system operators for various applications. Multi-fiber connectors are predominantly MPO fiber connectors. Commercially available MPO fiber connectors include fiber counts of, for example, 8, 12, 24, 48, or 72 fibers. For single mode (SM) fiber connectors which has much smaller fiber alignment tolerance than multimode fibers due to its much smaller fiber core, the most common fiber count of SM MPO connectors is 12 fibers today. Higher fiber count SM MPO connectors such as 24 or 48 fibers are also possible, although their optical performance deteriorates seriously compared to 12 fiber SM MPO connectors.

In part, the deteriorating performance with higher fiber counts is because conventional connectors are made with traditional polymer molding techniques; these molding techniques cannot achieve the precise alignment required. For example, physical pins must be positioned accurately in the mold to form the fiber holes and guide holes. However, it is very difficult to use molding to achieve a higher count 2-dimensional (2D) fiber holes accurately.

To satisfy the increasing demand of massive data transfer, components in optical communication systems are being developed to be miniaturized and highly integrated. Particularly, integrating large numbers of SM fibers (such as 144 or 576) on a single fiber connector is a long-felt need. However, great challenges lie in the fabrication of such fiber connectors.

There have been several approaches to make multi-fiber connectors with high-density 2D fiber arrays. In the following, each approach is reviewed.

1) Traditional MPO Multi-Fiber Connector

MPO connectors use MT connector ferrules to align the fibers. The MT connector ferrules for SM fibers typically have one linear array of 12 or 8 fiber holes, and two large guide holes for guide pin alignment.

MT connector ferrules are plastic parts made by plastic molding processes. Because fiber holes and guide holes are formed by molding plastics around physical pins in the mold, when there is a high count 2D array of physical pins, it is very difficult to position these pins accurately and replicate the mold faithfully.

Although a 72-fiber multimode MPO connector in a 2D configuration (12×6) has been introduced by some manufacturers, its geometrical precision of fiber holes and guide holes is far inferior to 12-fiber multimode MPO connectors. In addition, a SM fiber version of this connector is unavailable.

The operating principle of traditional MPO connectors is physical contact. Fibers are polished so that they protrude from the surrounding MT ferrule surface, to ensure uniform physical contact of every fiber surface. Higher fiber count MPO connectors not only have problems with SM fiber alignment tolerance, they also suffer from problems such as poor physical contact and sensitivity to dust and contaminants.

2) MXC Connector

In 2013, MXC connectors with 64 fibers using lenses were announced by Corning, Intel, and US Conec. While the lens-based design allows this connector to operate without physical contact and ensure much more robust connection, insertion loss is high (0.8 dB insertion loss) even for multimode fiber. Furthermore, MXC connectors are not availability for SM fiber.

The fiber ferrules in the MXC connectors are made by molding plastics, so these connectors suffer the same limitations as MPO connector ferrules.

A previous approach to non-contact fiber connectors is described by the inventor of the present application in U.S. patent application Ser. No. 13/725,087, filed Dec. 21, 2012, the disclosure of which is incorporated by reference herein.

Thus, there is a need in the art for improved manufacturing techniques for forming high-precision multi-fiber optical fiber connectors, especially for SM fibers. Such high precision multi-fiber optical fiber connectors could be used to terminate the large number of optical fibers needed in modern data centers and telecommunication systems.

SUMMARY OF THE INVENTION

The present invention provides a microfabrication method for manufacturing a high-density, recessed-fiber, multi-fiber optical connector ferrule, capable of providing sub-micron fiber alignment precision suitable for SM optical fibers. The method includes microfabricating a ferrule mold having a reverse-image of a through-hole array for optical fibers and guide holes. The through-hole array has at least four through-holes, including two guide holes and two fiber holes. Each guide hole is dimensioned and configured to hold and align a guide pin. Each fiber hole is dimensioned and configured to hold and align an optical fiber. Guide holes facilitate passive alignment between mating optical connectors.

A non-polymeric ferrule material is deposited in said ferrule mold, followed by removing the ferrule mold to create a non-polymeric multi-fiber connector ferrule.

An optical fiber is inserted to extend through each of the fiber holes and affixed by a suitable adhesive. Each optical fiber is polished to form an endface, which is approximately level with the top surface of the multi-fiber connector ferrule but is slightly recessed from said top surface by a distance of at least approximately 0.1 micron. The recess may be formed by differential polishing of the non-polymeric ferrule and fiber endfaces. Alternatively, a layer of spacer material may be deposited over said top surface of the multi-fiber connector ferrule.

An antireflection coating is deposited such that it covers said top surface of the multi-fiber connector ferrule and the endfaces of the recessed fibers.

DETAILED DESCRIPTION

Figure 1A:
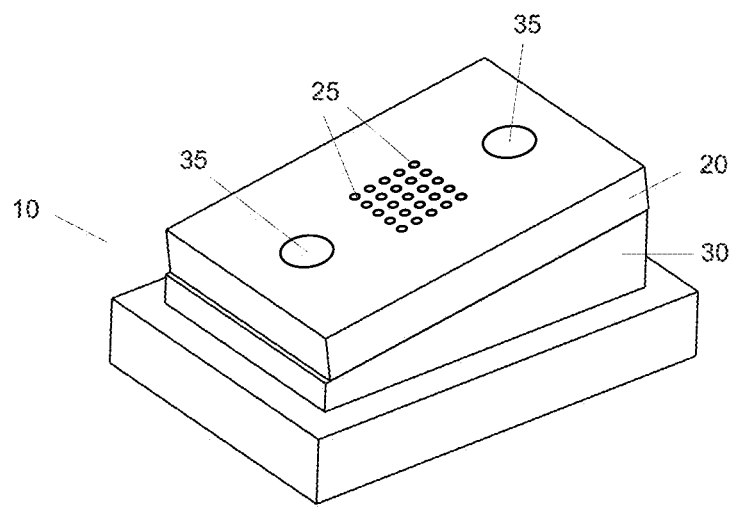
FIG. 1a and FIG. 1b depict perspective and cross-sectional views of a multi-fiber optical connector ferrule 10 made by the method of the present invention.
Figure 1B:
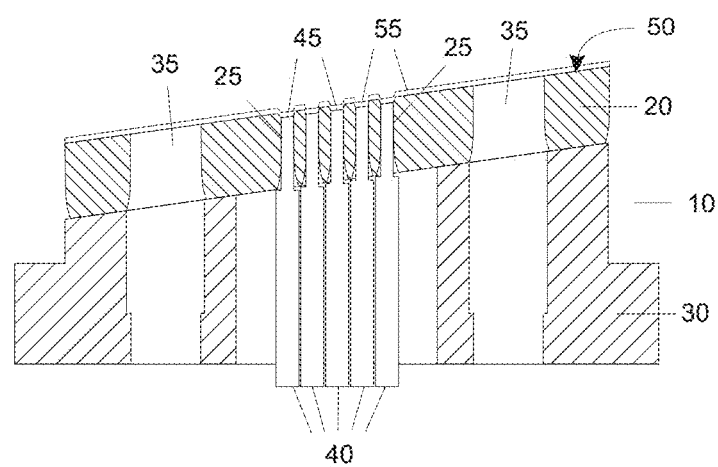

Turning to the drawings in detail, FIGS. 1a-1b depict perspective and cross-sectional views of a non-contact multi-fiber connector ferrule 10 formed by the method of the present invention.

The non-contact multi-fiber connector ferrule 10 includes a ferrule chip 20 and a ferrule pedestal 30. The ferrule chip 20 is significant because it provides the very high precision of this non-contact multi-fiber connector ferrule 10.

The ferrule chip 20 has at least four through holes, including two guide holes 35 and two fiber holes 25. Each guide hole 35 is dimensioned and configured to hold and align a guide pin. Each fiber hole 25 is dimensioned and configured to hold and align an optical fiber. Guide holes 35 facilitate passive alignment between mating multi-fiber optical fiber connectors.

While twenty-five fiber holes (5×5 array) are depicted for clarity of presentation, it is understood that substantially larger numbers of fiber holes may be formed in the multi-fiber optical connectors of the present invention. For example, a 2D array of 12×12 fiber holes or 24×24 fiber holes may also be formed in the multi-fiber optical connectors. Those of ordinary skill in the optical connector art will appreciate that an arbitrary number of fiber holes in arbitrary configurations may be formed using the disclosed techniques.

Inserted in each fiber hole 25 is an optical fiber 40 which may be a single mode (SM) or multimode optical fiber. The precise microfabrication techniques used to make the ferrule chip create a connector where the fiber alignment precision is sufficient for the smaller core of the SM optical fibers. As seen in FIG. 1b each fiber endface 45 is recessed from a ferrule contact surface 50 of ferrule chip 20. An antireflection (AR) coating 55 is deposited over each fiber endface 45 and on the ferrule contact surface 50. Guide holes 35 are optionally included to facilitate passive alignment between mating optical connectors.

To manufacture the ferrule chip 20, a ferrule mold is microfabricated having "chimney-like" pillars for the fiber holes and guide holes, as depicted in the example microfabrication process of FIGS. 2a-2l, including the steps of mask preparation, photolithography, dry etching, metal electroplating and demolding.

In the example of FIGS. 2a-2l, the central axis of the fiber hole is slightly tilted with respect to the surface normal of the ferrule chip. In this exemplary embodiment, the tilt angle is selected to be 6 degrees. The tilt angle is selected to minimize return loss for the optical fiber connections. However, it is understood that the microfabrication process depicted in FIGS. 2a-2l may also be used to form other angles or multi-fiber optical connectors with no angle.

The microfabrication process of FIGS. 2a-2l are performed using silicon as the mold material to form the ferrule chip 20. However, other materials may be used to form the mold material such as photoresist and other polymeric materials. Other semiconductor materials such as germanium may also be used. Metals may also be used. In short, any material that is susceptible to microfabrication techniques and can be formed with submicron accuracy may be used as the mold material to form ferrule chip 20.

Wafer Bonding

Figure 2A:
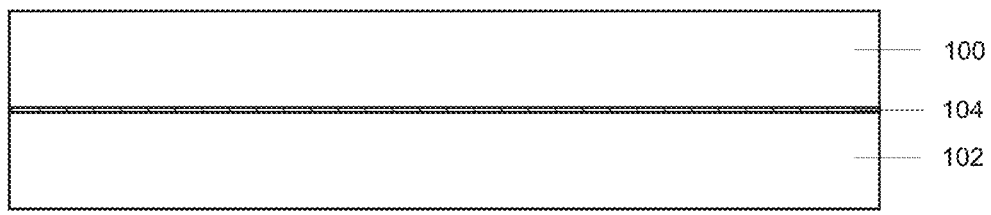
FIG. 2a shows a silicon wafer bonded to a support wafer.

Referring to FIG. 2a, there is a silicon wafer 100 that serves as the substrate for microfabrication, and another silicon wafer 102 that serves as an optional support substrate. The two wafers 100 and 102 are bonded together and there is a metal layer 104 between the two silicon wafers for the subsequent electroplating step. The metal layer 104 is preferably a thick layer of metal such as tin, aluminum, gold, or alloys thereof.

Photoresist Coating

Figure 2B:
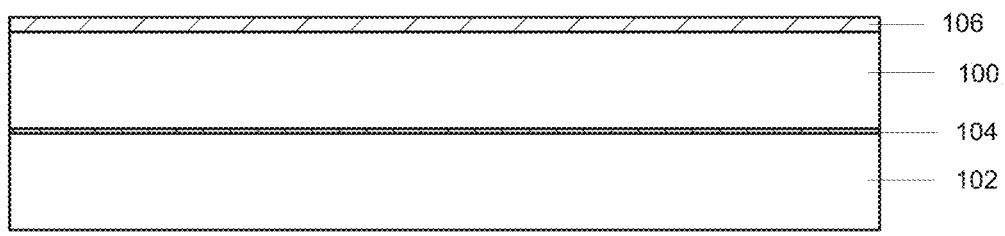
FIG. 2b shows the silicon wafer structure of FIG. 2a with a photoresist layer coated on its top surface.

In FIG. 2b, the silicon wafer 100 is shown coated with a photoresist layer 106 on its top surface. The photoresist may be either organic or inorganic, positive or negative depending on the selected mask design. It may be applied by any appropriate techniques, including but not limited to dipping, spraying, spinning or vapor deposition. In an exemplary embodiment, a spin-coated 5740 Novolak photoresist with a 2 micron thick layer is used as layer 106.

Photomask

Figure 2C:
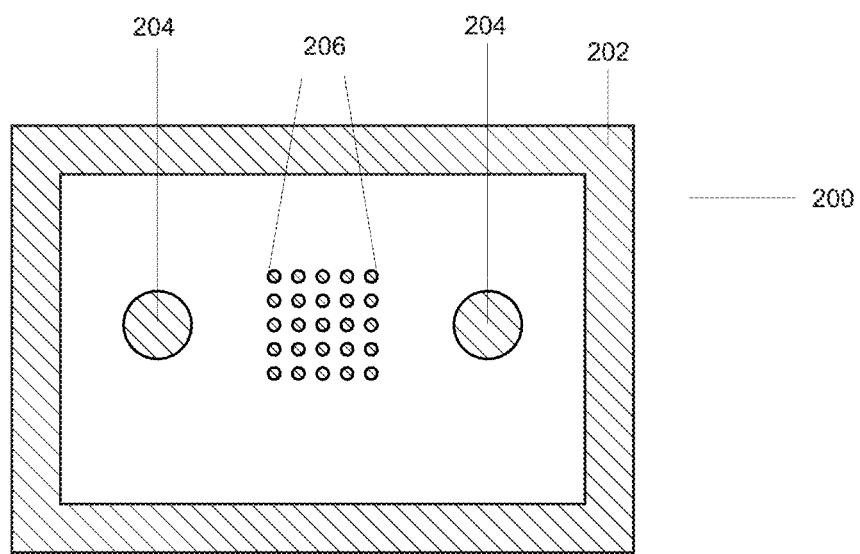
FIG. 2c shows a photomask which contains guide holes, fiber holes and optional ferrule chip wall.

A photolithographic mask 200 is used for microfabrication. Referring to FIG. 2c, the photomask includes designed patterns of guide holes 204, an array of fiber holes 206 and optionally ferrule chip wall 202. Fiber holes and guide holes can take other forms than round hole.

Mask 200 assumes a positive photoresist, so that exposed photoresist is removed in a subsequent development step.

UV Exposure

Figure 2D:
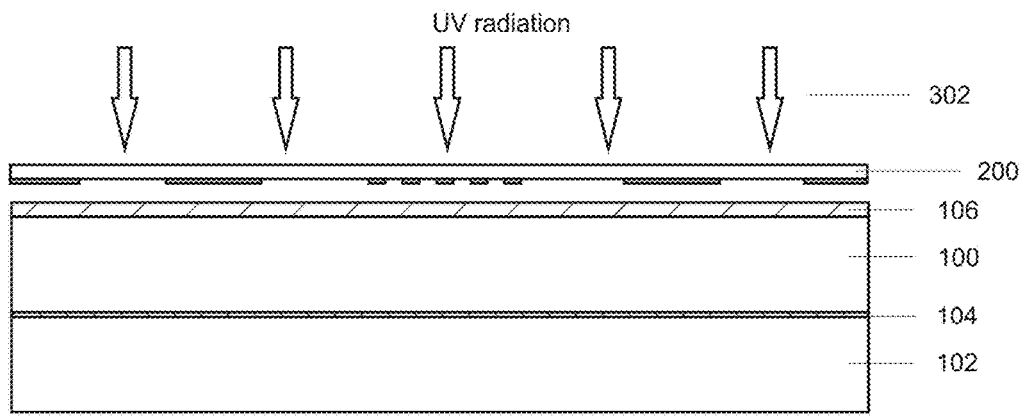
FIG. 2d shows photolithography performed with the photomask of FIG. 2c.

As shown in FIG. 2d, photolithography is performed with the photomask 200. UV radiation 302 (or other selected radiation, including x-rays, laser radiation, etc., depending upon the selected photoresist) replicates the photomask pattern on the photoresist 106.

Photoresist Development

Figure 2E:
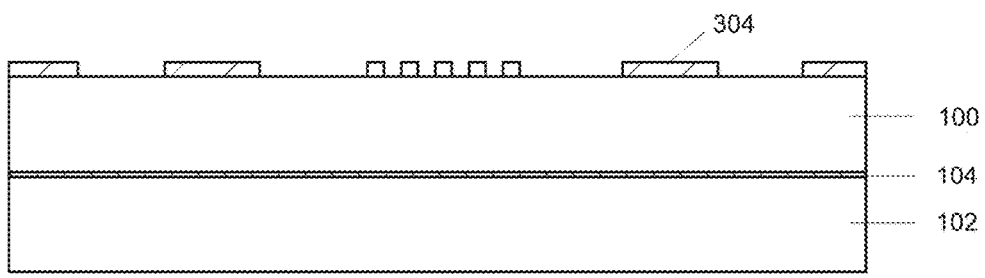
FIG. 2e shows the structure of FIG. 2b after the photoresist development step.

After photoresist development (involving removal of the exposed photoresist), the pattern shown in FIG. 2e is formed. Areas intended to be guide holes and fiber holes are protected by photoresist 304, which serves as an etch barrier during subsequent processing.

Dry Etching

Figure 2F:
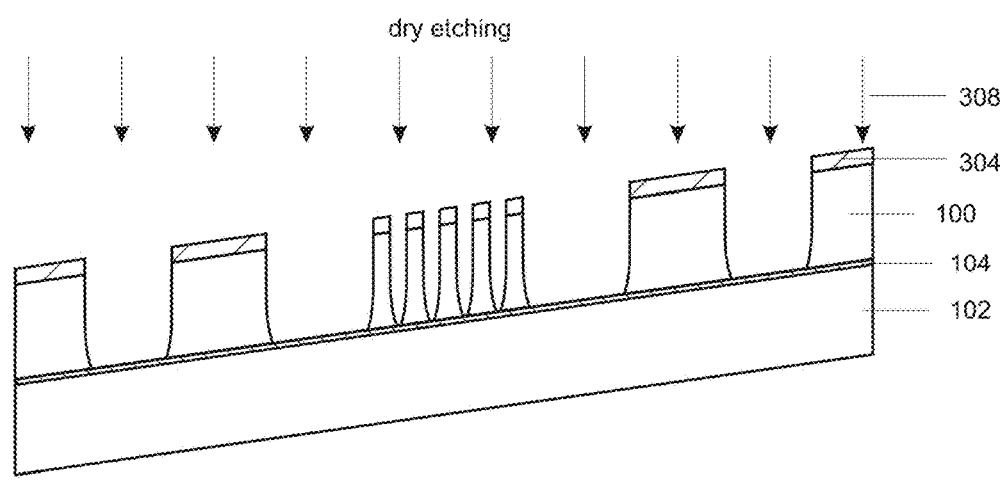
FIG. 2f shows the structure of FIG. 2e after dry etching step.

The silicon wafer 100 is etched in a dry etching process, as shown in FIG. 2f. In a preferred embodiment, etching should be done using a DRIE (deep reactive ion etching) process or other microfabrication techniques which can provide sub-micron accuracy.

Dry etching plasma 308 will etch through the silicon wafer 100 from the top surface until it reaches an etch stop layer, and metal layer 104 is exposed.

In a preferred embodiment, the wafer should be tilted with a small tilt angle with respect to the dry etching direction. The preferred tilt angle is 6 degree.

Stripping Photoresist

Figure 2G:
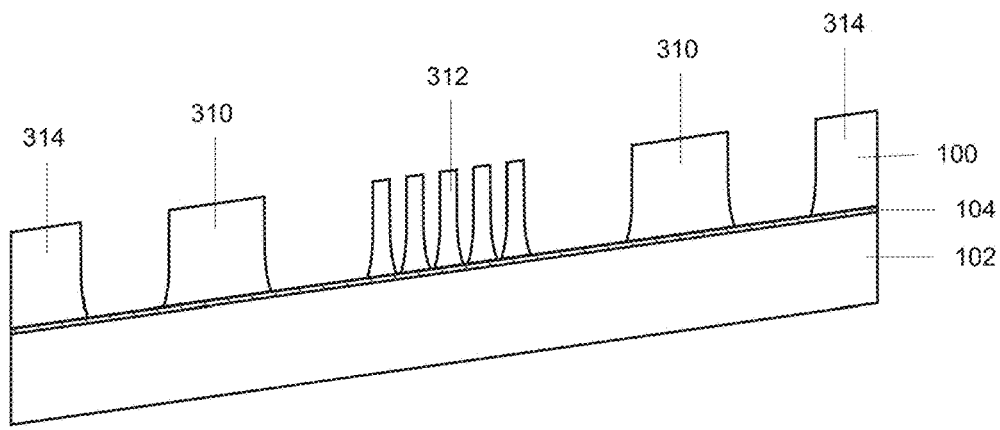
FIG. 2g shows the completed silicon ferrule mold.
Figure 2H:
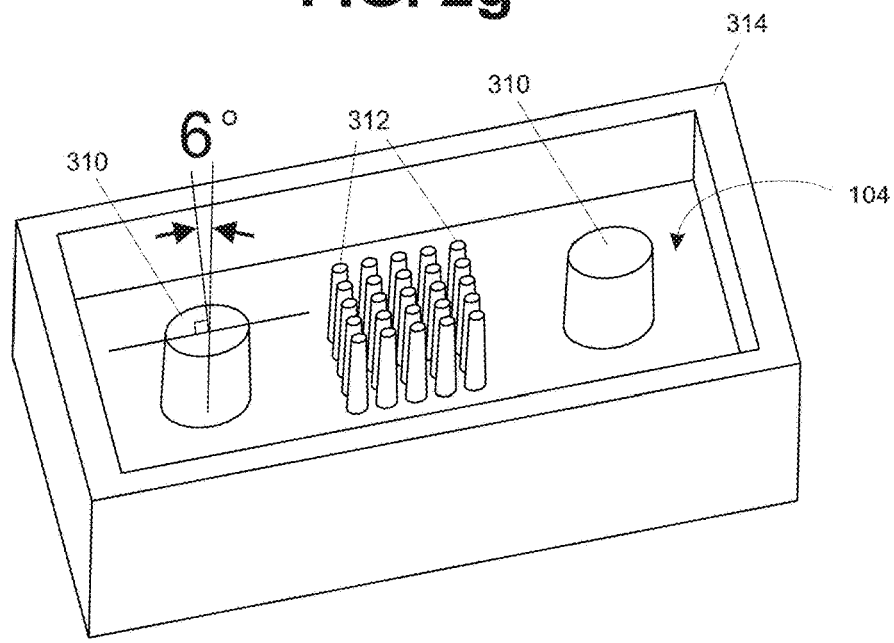
FIG. 2h is a perspective view of the silicon ferrule mold.

After the dry etching step, the remaining photoresist 304 should be stripped, so that a silicon ferrule mold is completed, including pillars for fiber holes 312 and pillars for guide holes 310, and a ferrule chip wall 314, as shown in FIG. 2g (side view). A perspective view of the silicon ferrule mold is shown in FIG. 2h. In the preferred embodiment, the fabricated pillars 312 and 310 should have slightly enlarged bottom.

The structure depicted in FIG. 2g will serve as a mold for the ferrule chip as seen in the subsequent processing steps.

The ferrule mold can be formed using any microfabrication method which can provide sub-micron accuracy, including but not limited to LIGA, UV LIGA, and laser microprocessing. Another preferred method to form the ferrule mold is by using SU-8 photopolymer.

Electroplating

Figure 2I:
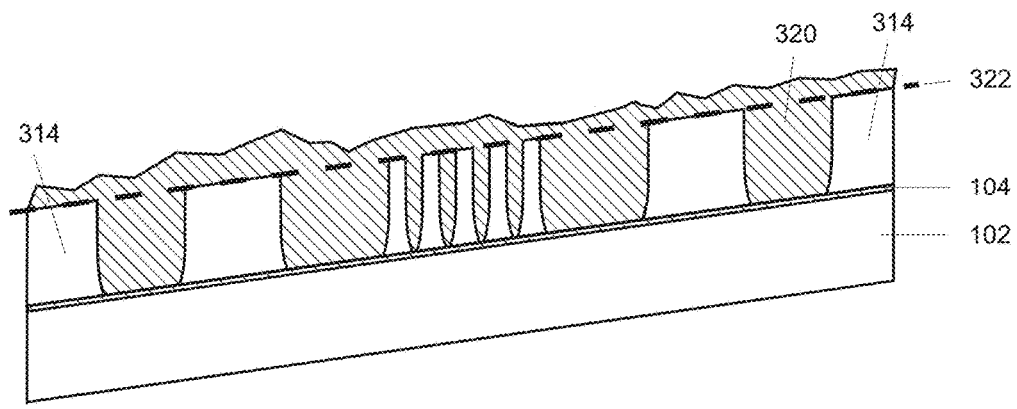
FIG. 2i shows the silicon ferrule mold after the electroplating step is completed.

An electroplating process to form the ferrule chip is conducted by making electrical contact to the metal layer 104 in an electroplating bath, to gradually fill up the empty space of the silicon ferrule mold with metal 320 from the metal layer 104, until it overflows from the top of the silicon pillars. FIG. 2i is a schematic view of the ferrule mold filled with metal to form the ferrule chip after electroplating is completed.

A preferred material for metal 320 may be a nickel alloy. However, other materials having over 50 GPa Young's modulus can be used. The mold filling method is not limited to electroplating. For example, stamping or nanoimprint methods may also be used to create the metal ferrule chip 20.

Other deposition methods may also be selected depending upon the material to be used to form the ferrule. These include vapor deposition (chemical vapor deposition, evaporation, sputtering, ion beam deposition) or molding techniques when ceramic-based materials are selected for the ferrule.

Polishing to Remove Excess Metal

Figure 2J:
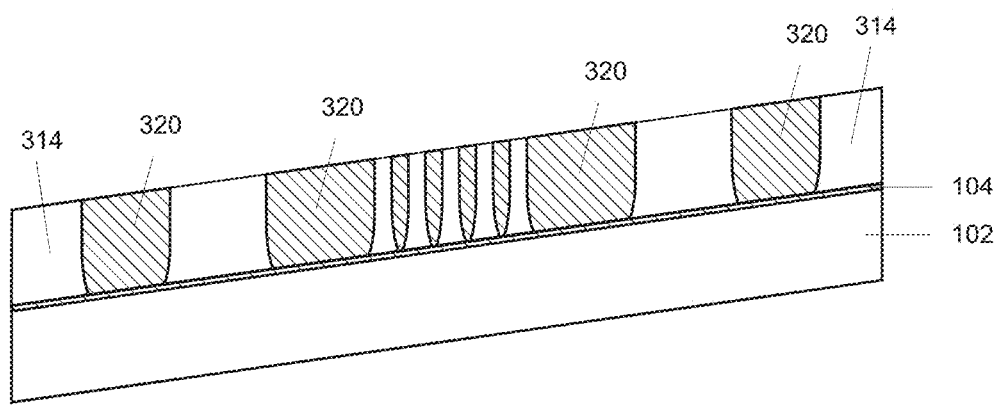
FIG. 2j shows the electroplated silicon ferrule mold after the polishing step is completed.

The electroplated wafer of FIG. 2i is polished along polishing plane 322 to remove the over-deposited metal, ensuring a flat surface of the fabricated ferrule chip. FIG. 2j is a schematic view of the ferrule chip still in the ferrule mold after the polishing step is completed.

Ferrule Mold Release

Figure 2K:
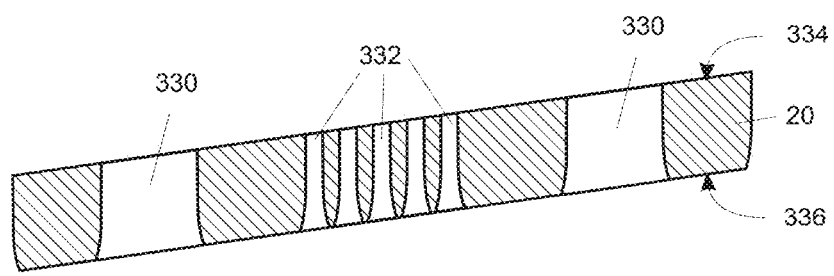
FIG. 2k shows a finished ferrule chip.

Metal ferrule chips 20 are released from the silicon ferrule mold by etching away the silicon wafers by a suitable process, for example wet etching. Mechanical methods of mold release may also be selected. Dicing may be unnecessary because the ferrule chips are separated by ferrule chip wall 314. FIG. 2k is the finished ferrule chip 20.

Ferrule Chip Configuration

Figure 2L:
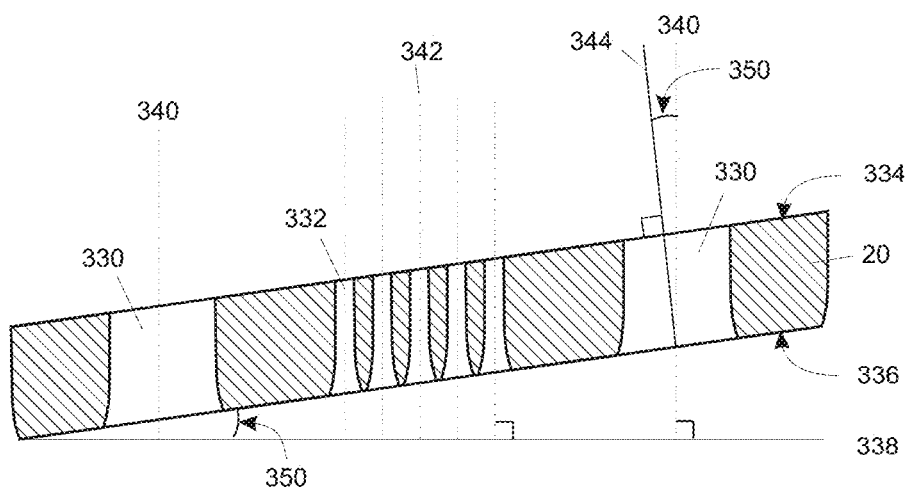
FIG. 2l further depicts the finished ferrule chip.

FIG. 2l is the ferrule chip 20 in further detail. The ferrule chip 20 is a thin layer of metal material. It has two sets of through-holes, including two guide holes 330 and five fiber through-holes 332. Each guide hole 330 is dimensioned and configured to hold and align a guide pin, while each fiber hole 332 is dimensioned and configured to hold and align an optical fiber.

In the preferred embodiment the ferrule chip 20 has a thickness of approximately 700 microns. This thickness provides sufficient structural integrity, while being thin enough to be made economically using a microfabrication process.

While a 25-count array of fiber holes is depicted for clarity of presentation (5 in cross section times five rows deep), it is understood that substantially larger numbers of fiber holes in arbitrary configurations may be formed in the multi-fiber connector ferrule of the present invention. For example, a 2D array of 12×12 fiber holes or 24×24 fiber holes may be made using the method of the present invention.

Tilt Angle

As shown in FIG. 2l, the central axes 340 of guide holes 330 and central axes 342 of fiber holes 332 should be parallel to each other. In one embodiment, there is a small tilt angle 350 between the hole axis 340 and the surface normal 344 of the ferrule chip 20. This tilt angle may help to improve the multi-fiber optical connector's return loss. This tilt angle may be preferably from 5-8 degree, but may be other angles, for example, from 1 degree to 15 degree.

Fiber Hole and Guide Hole Profile

As shown in FIG. 2l, near top surface 334 of the ferrule chip 20, the fiber hole and guide hole diameters are uniform along the central axis 340 and 342 to provide accurate fiber angular alignment, but become wider to facilitate easy fiber insertion from the back side 336 of the ferrule chip 20.

Fiber holes and guide holes are most accurate on top surface 334 of the ferrule chip 20, where guide holes 330 and fiber holes 332 have sub-micron accuracy in their central locations due to the microfabrication process. This accuracy ensures accurate alignment of SM fibers with minimum insertion loss.

Combining Ferrule Chip with Ferrule Pedestal

Figure 3A:
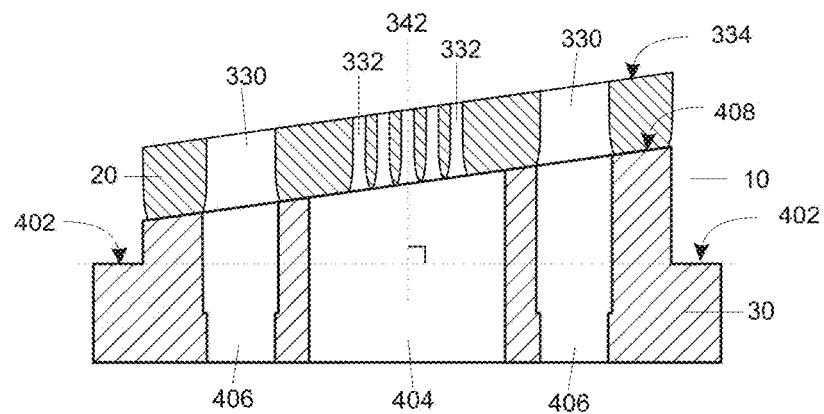
FIG. 3a shows a multi-fiber connector ferrule including a ferrule chip and a ferrule pedestal.

FIG. 3a shows a multi-fiber connector ferrule 10, including a ferrule chip 20 and a ferrule pedestal 30. Because the ferrule chip 20 is a thin layer, the multi-fiber connector ferrule 10 optionally uses additional structure during later processing and in eventual operation inside an optical fiber connector housing. The ferrule chip 20 may be affixed permanently to a ferrule pedestal 30 to form the multi-fiber connector ferrule 10.

The ferrule pedestal 30 may include a flange 402, a fiber cavity 404, two guide pin cavities 406 for fibers and guide pins to pass through, respectively. Fiber cavity 404 is preferably separate from the two guide pin cavities 406. By separating the fiber cavity, epoxy used to affix the fibers does not flow into and block the guide holes 330.

Guide pin cavities 406 may have a slightly larger diameter than the diameter of the guide hole 330 near the ferrule top surface 334, to avoid interference with the operation of the guide holes 330. However, the guide pin cavities 406 may have a narrow part near their bottom portions, to define the angle of the guide pins (two points determine a line).

The ferrule pedestal 30 may have a flange 402 for easy positioning and surface registration. The ferrule pedestal 30 may have a tilted surface 408, and the angle of the tilted surface is the same as tilt angle 350 of the ferrule chip 20 in FIG. 2l, so that fiber hole axis 342 is perpendicular to the flange surface 402. The flange design facilitates a subsequent polishing operation, and when the multi-fiber connector ferrule 10 is assembled into a connector housing, not shown. The ferrule pedestal 30 may be formed from plastics, metal, or any other rigid material.

Fiber Insertion

Figure 3B:
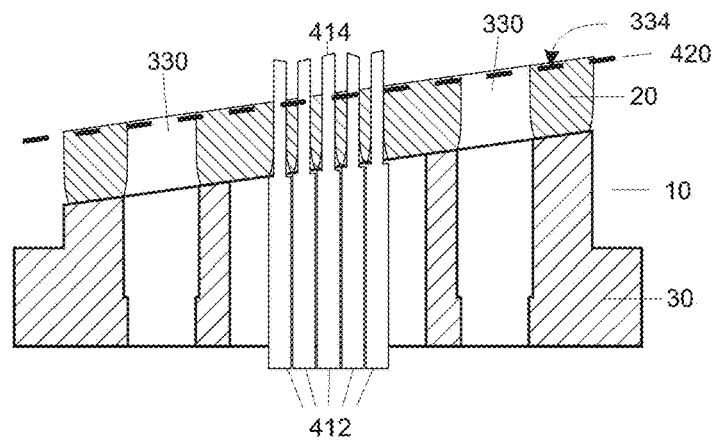
FIG. 3b shows the multi-fiber connector ferrule after fibers are inserted through the fiber through-holes and permanently affixed with epoxy.

FIG. 3b depicts a cross-sectional view of the multi-fiber connector ferrule 10, after fibers 412 are inserted through the fiber holes and permanently affixed with epoxy or other suitable fixing agent. The optical fiber 412 may be a SM or multimode optical fiber. A length of fiber with plastic jacket stripped 414 is shown in FIG. 3b.

Care must be taken to ensure that no epoxy flows into the guide holes 330. Care must be taken to ensure that epoxy does not flow downward along the fibers 412 through a capillary effect and make the fibers 412 too rigid. Otherwise, it would require too much force on the guide holes 330 to passively align the connector ferrule 10.

As shown in FIG. 3b, after affixing the fibers with epoxy, the fibers 414 protrude from the ferrule chip surface 334.

The multi-fiber connector ferrule 10 is polished along polishing plane 420, which is parallel to original ferrule chip top surface 334. This ensures that very little ferrule chip material is polished away.

Because fiber holes and guide holes are most accurate on top surface 334 of the ferrule chip 20, and plane 420 is very close to plane 334, fiber holes and guide holes are very accurate on plane 420 as well.

Recessed Fiber Endfaces

Figure 3C:
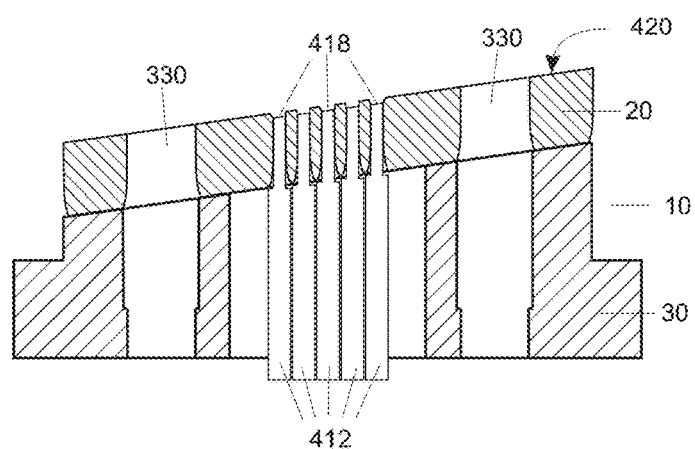
FIG. 3c shows the multi-fiber connector ferrule after the polishing step, showing recessed fiber endfaces.

The multi-fiber connector ferrule 10 should have fiber endfaces 418 slightly recessed from the new ferrule chip top surface 420, as shown in FIG. 3c.

To achieve the recessed fiber endfaces 418, one embodiment uses a differential polishing process. This differential polishing process uses cerium oxide as the final polishing particle. During differential polishing, the glass material of the optical fiber is removed at a greater rate than the nickel alloy material of ferrule chip 20. Therefore, the fiber endfaces 418 are recessed with respect to the surrounding ferrule chip top surface 420.

Fiber endfaces 418 are prevented from making contact with opposing fiber endfaces in a mating connector by the recessed fiber endfaces. For SM fiber, a recess of approximately 0.5-1.0 micron is sufficient to prevent fiber endfaces 418 from making contact with mating fiber endfaces.

Recessed fiber depth can be made larger (3-5 microns for example) so that any large contaminants such as dust would be contained in the recess without affecting fiber endfaces 418. This larger recess makes the multi-fiber connector more tolerant of dusty and contaminated environments. Recessed fiber depth from 0.1 micron to 10 microns may be selected.

An alternative method to achieve recessed fiber endface 418 is to deposit a thin layer of spacer material on the top surface 420 of the ferrule chip 20. One preferred embodiment may be additional electroplating after fibers are polished, to plate a thin layer of metal such as nickel on the metal surface of the ferrule chip 420, causing the fiber endfaces 418 to be recessed from the surrounding ferrule chip surface. Because the silica fiber is non-conducting, electroplated nickel will not cover the fiber endfaces 418 and therefore a spacer is formed.

AR Coating

Figure 3D:
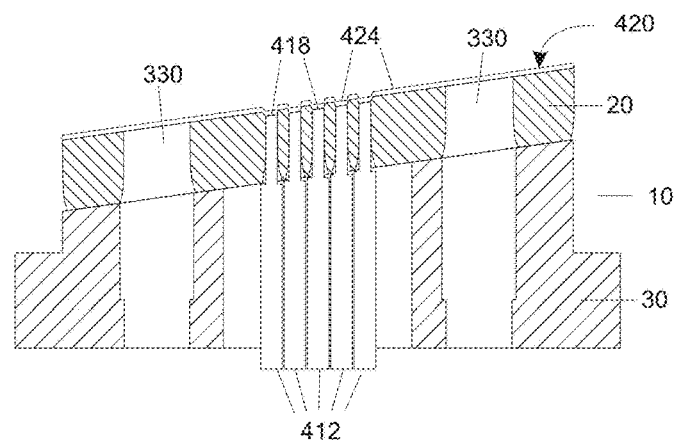
FIG. 3d shows the multi-fiber connector ferrule 10 after the antireflection coating.

In order to eliminate the multiple reflections between two fiber endfaces with an air gap in between, an antireflection (AR) coating layer 424 is coated over the fiber endfaces 418 as shown in FIG. 3d. Typically the top surface 420 of the ferrule chip 20 is also coated. The AR coating layer 424 is intended to cover the entire surface, except guide holes 330 which are protected by a suitable deposition mask.

The AR coating band is selected according to the operating wavelength range of the optical system in which the connector is to be used. An AR coating with residual reflectivity of less than 0.2% may be selected. The thickness of the AR coating is typically on the order of 1 micron. This thickness is sufficient to achieve the desired antireflection properties.

Male Ferrule Chip

Figure 3E:
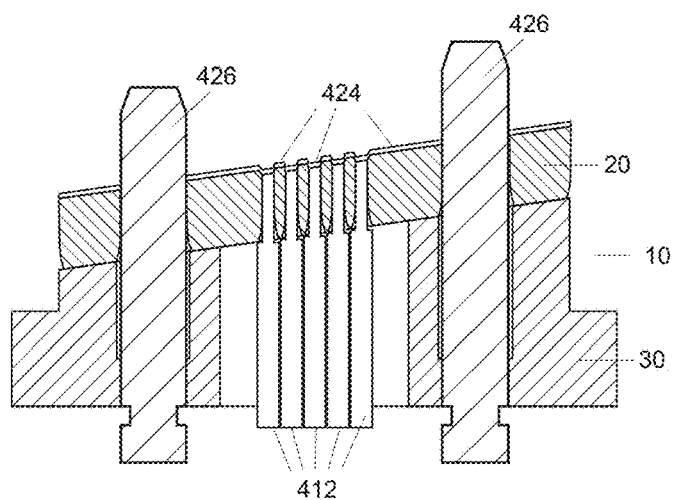
FIG. 3e shows a male multi-fiber connector ferrule with guide pins in place.
Figure 3F:
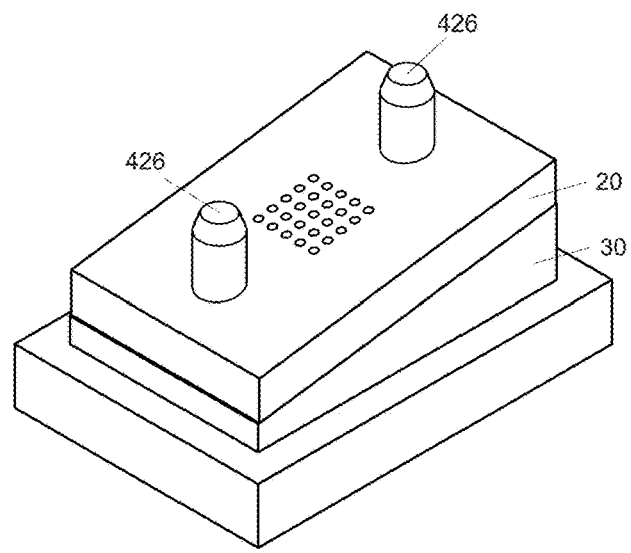
FIG. 3f is a perspective view of the male multi-fiber connector ferrule.

FIG. 3e shows a cross-sectional view of the multi-fiber connector ferrule 10 with guide pins 426 in place to create a "male ferrule". A perspective view of the same part is shown in FIG. 3f. Guide pins 426 typically have a chamfered tip which facilitates insertion into the guide holes. Guide pins 426 may be made of stainless steel with a precise diameter and smooth surface. However, other rigid materials such as ceramics may also be used to make the guide pins 426.

Two Ferrules Mated Together

Figure 3G:
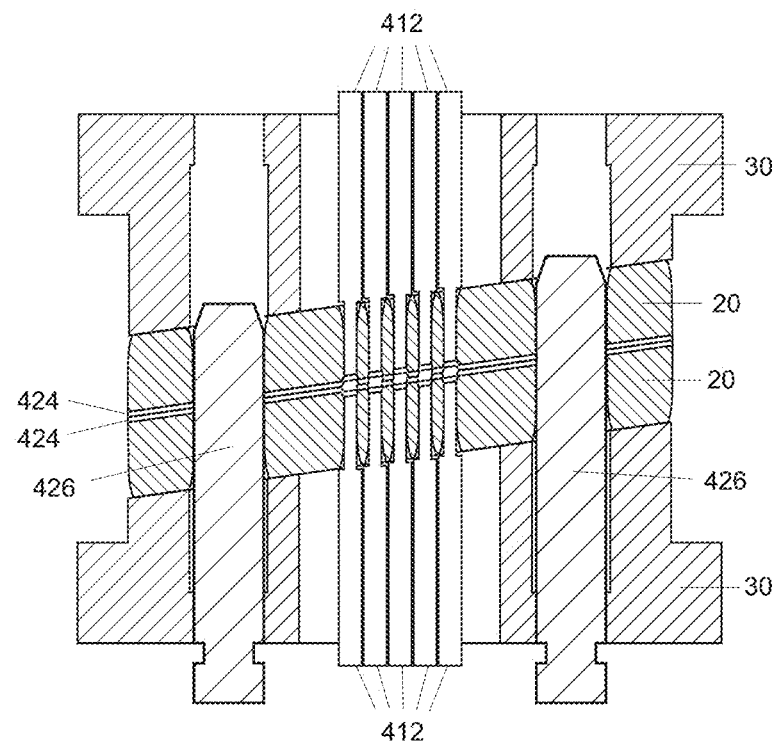
FIG. 3g shows the female and male multi-fiber connector ferrules mated together.

FIG. 3g depicts a cross-sectional view of female and male multi-fiber connector ferrules mated together. The AR coating layers 424 of the two opposing connector ferrules contact each other.

Guide pins 426 are positioned by the guide holes to align the top connector ferrule to the bottom connector ferrule, thereby achieving precise sub-micron alignment of each of the fibers 412 with mating fibers of the opposing connector ferrule. The presence of fiber recess will prevent the fiber endfaces from making contact. The AR coating 424 on the surface of the ferrule chip 20 will make contact during the operation of the connector, but because the connector ferrule surface is flat and large, the force is distributed over a larger area, preventing flaking or chipping of AR coating 424.

Optional Tilt Angle

The reasons for the optionally tilted fiber holes and guide holes are the following. It is well known that fiber connector endfaces are often polished at an angle (for example 8 degree) in order to have a high return loss value, for example, above 60 dB. If fiber holes and guide holes are formed in a new ferrule chip 440 with a tilt angle of zero degree, as illustrated in FIGS. 4a and 4b, then the new ferrule chip 440 may optionally be polished with a tilt angle of 8 degree, for example.

Figure 4A:
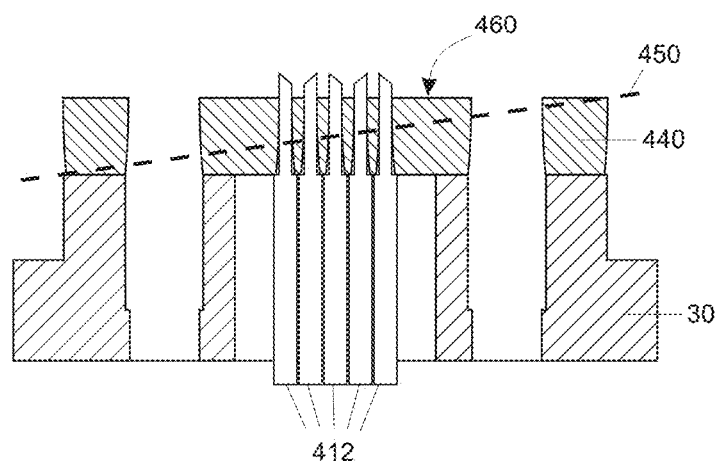
FIG. 4a shows a multi-fiber connector ferrule with no tilt angle, with fibers inserted.

FIG. 4a shows the new ferrule chip 440 with fibers 412 inserted and affixed with epoxy. Polishing plane 450 is shown. Fiber holes and guide holes are most accurate on the top surface 460 of the ferrule chip 440.

Figure 4B:
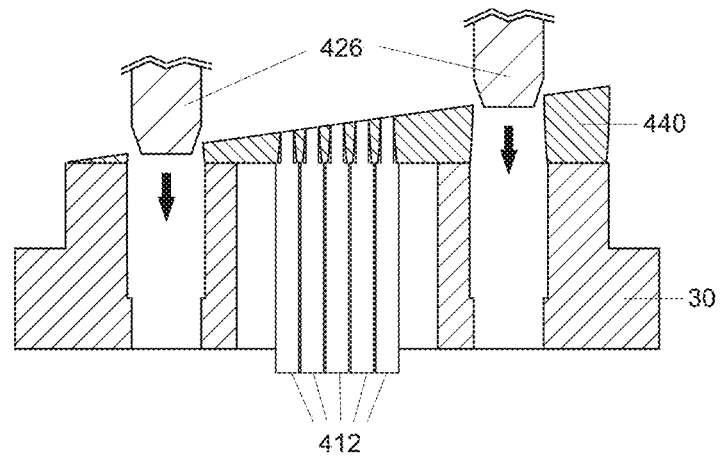
FIG. 4b shows the female multi-fiber connector ferrule after the polishing step, ready to receive guide pins.

FIG. 4b shows the female multi-fiber connector ferrule after the polishing step, ready to receive guide pins 426. Two consequences can be seen:

An 8-degree polishing step could polish away one side of the ferrule chip 440 completely, because the ferrule chip is only about 0.7 mm thick in the preferred embodiment.

After a polishing step, guide hole openings may not be accurate enough to align guide pins 426, because the most accurate part of the guide holes on the top surface 460 of FIG. 4a may be polished away, resulting in enlarged guide hole openings. Likewise, fiber endface positions may not be sufficiently accurate.

The major benefit of the tilt angle is that grinding away of significant ferrule chip material is avoided. Referring to FIG. 3c, all fiber hole openings and guide hole openings have the same shape after a polishing step. Fiber holes and guide holes are the most accurate, because they are polished very little.

In a preferred embodiment for high return loss, the tilt angle is chosen to be 6 degree or 8 degree, but it can be any angle from 1 degree to 15 degree. If high return loss is not a concern, a tilt angle of zero degree may also be selected.

Optical Performance of the Multi-Fiber Connector

Because the multi-fiber connectors disclosed here are formed by photolithographic processes, the center positions of the guide holes and fiber holes have tolerances of about 0.1 micron, and the diameters of the guide holes and fiber holes can be controlled to have a variation of less than 1 micron.

In terms of optical performance, SM multi-fiber connectors made with the method disclosed herein can have insertion loss range from 0 to 0.3 dB, and return loss from 55 to 80 dB. This is approximately the same insertion loss as a SM optical fiber connector (LC, SC, FC etc.) and thus is acceptable in the "loss budget" of an optical system. The fabrication techniques are reproducible and scalable to mass-production of multi-fiber connectors.

Metal ferrules made of materials such as nickel have many advantages compared to molded plastic MT ferrules.

A metal connector ferrule has much greater hardness, much lower coefficient of thermal expansion (CTE), much better thermal stability, can withstand a much higher processing temperature, will outgas much less in a vacuum environment such as an AR coating chamber, has much better resistance to guide pin abrasion and much longer mating lifetime, and has smaller electromagnetic interference due to the conductive metal material.

Photomask Pattern Elongation Due to Tilt Angle

Referring to FIG. 2l, because the tilted fiber holes and guide holes are sized to receive round fibers and round guide pins, the cross section of fiber holes and guide holes must be round on a plane perpendicular to the fiber axis. A 2D array of round fiber hole patterns with equal pitch in the two directions on plane 338 will become a 2D array of elliptical fiber hole patterns with an unequal pitch when projected on the ferrule chip surface 334, the latter of which are the patterns that the photomask must be designed with. The length of the photomask patterns is "stretched" in one direction with a scaling factor of $1/\cos(\theta)$.

Preferably, the tilt angle $\theta$ should be in one direction of the 2D fiber hole array, although this is not necessary.

If the tilt angle $\theta$ is 6 degree, the scaling factor is 1.01. This is a small correction; however, it ensures sub-micron alignment of fibers in the fiber holes. For example, a round hole of 126 micron diameter on plane 334 will become an elliptical hole of sizes 126 micron and 124.7 micron on plane 338, with the smaller number being too small for a 125 micron diameter fiber.

In order to form a 2D array of fiber holes of 126 micron diameter with 250 micron pitch with a tilt angle of 6 degree, a photomask may be designed to have a 2D array of elliptical holes of sizes 126 micron and 127.26 micron with a pitch of 250 micron and 252.5 micron in the two orthogonal directions.

Dust Channel in the Guide Hole

Because the manufacturing method disclosed herein uses microfabrication, arbitrarily-shaped guide holes may be formed. Various modifications to the guide hole may be made.

In conventional MPO connectors, guide holes are made by molding plastics around a cylindrical object; therefore, it is nearly impossible to have any other shape for the guide holes than round guide holes. Dust or contaminants tend to build up and clog the micron-sized gap between the round guide pin and round guide hole.

Figure 5:
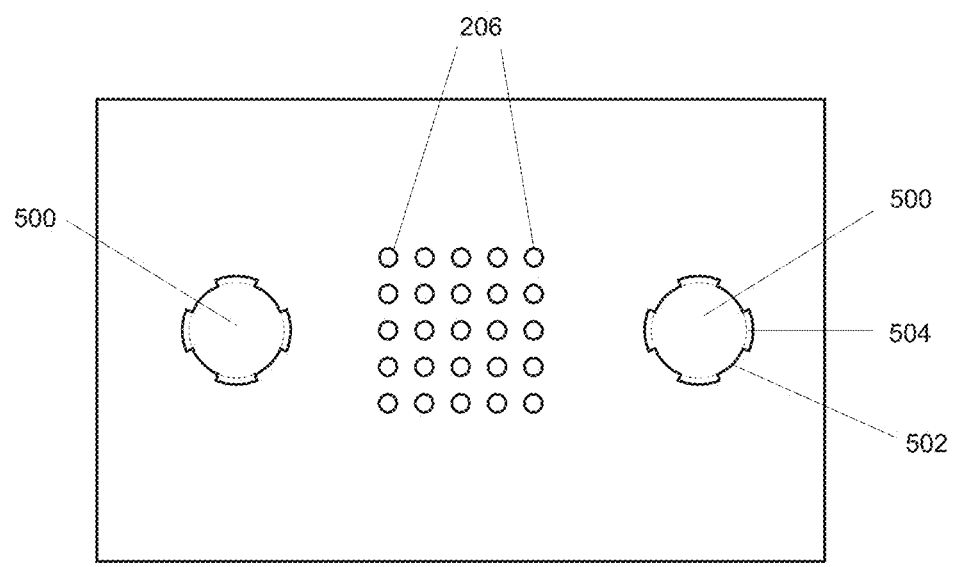
FIG. 5 shows top view of a ferrule chip with modified guide holes with dust channels.

FIG. 5 shows top view of a ferrule chip with modified guide holes 500, which has original unmodified sidewall parts 502 which contact the round guide pin, and modified sidewall parts with "dust channels" 504 which do not contact the round guide pin. The guide hole's dust channels 504 run vertically along the side walls. Alignment of the guide pin is provided by the unmodified sidewall 502. With this structure, small amount of dust or contamination on the guide pins is pushed into the dust channels of the guide holes during connector mating. Therefore, enhanced dust tolerance of this connector is achieved without reducing the alignment accuracy of the multi-fiber connector ferrule and without sacrificing any optical performance.

Spring-Loaded Guide Hole

Figure 6:
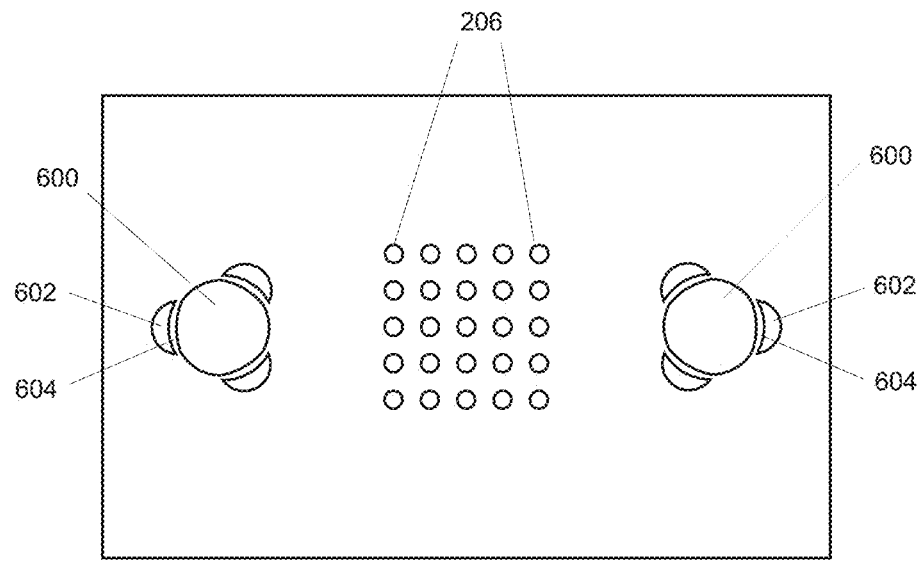
FIG. 6 shows top view of a ferrule chip with modified guide holes which have spring-loaded sidewalls.

FIG. 6 shows top view of a ferrule chip with modified guide holes 600 which has spring-loaded sidewalls. By forming hollow channels 602, part of the sidewall 604 of the guide hole has a thin, deformable wall. The deformable wall acts as a spring-like structure in deforming and resuming its original shape and thus can act as a spring-loaded guide hole.

There are two benefits to a spring-loaded guide hole 600. First, guide pins slightly larger than the undeformed guide hole diameter can be inserted when the spring-loaded wall structure deforms, leaving zero gap between the guide pin and guide hole, and a more precise self-centered alignment. Second, due to the adjustable nature of the spring-loaded guide hole, the guide pin does not need to have the same diameter tolerance that a fixed guide hole would require. The cost of the guide pins is reduced as a result.

It is important to ensure the hollow channels 602 are not filled with debris. Otherwise, the spring-loaded guide hole 600 may be affected.

Elongated Female Guide Hole

Referring to FIG. 3g, the distance between the two guide holes has a tolerance of less than 1 micron. However, at the tips of the guide pins of the multi-fiber connector ferrule, the distance between the two guide pins is frequently not exactly the same as that of the guide hole distance, due to the guide pins being not parallel to each other, or due to slight bending of the guide pins. When the two guide pins first enter the two female guide holes, this mismatch will cause excessive abrasion of the guide pins and guide holes. The entrance of the guide holes tends to be eroded quickly, resulting in the loss of precision of guide hole alignment, and the reduction of the mating life of the multi-fiber connector.

Figure 7:
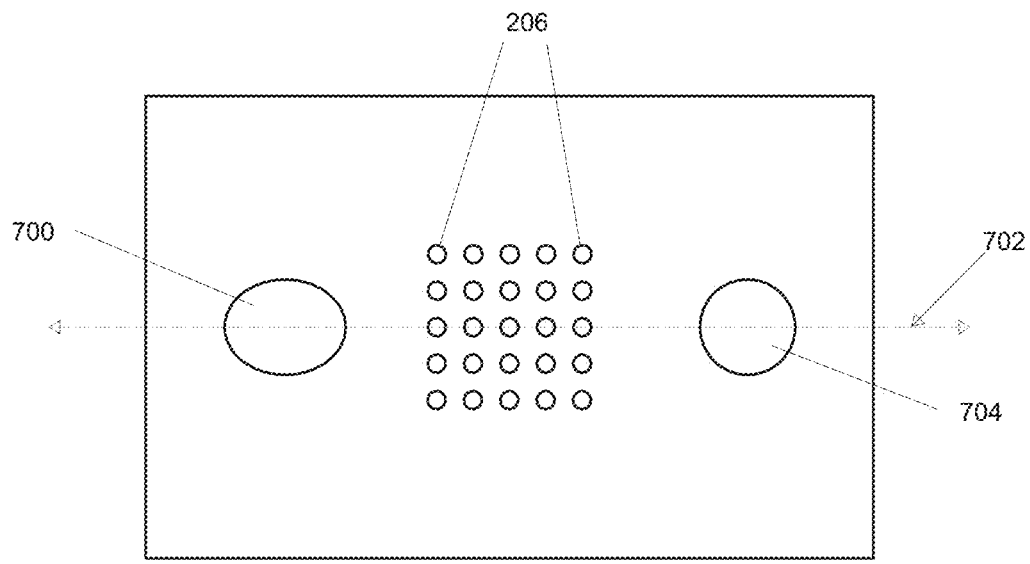
FIG. 7 shows top view of a female ferrule chip with modified guide holes, where one guide hole is round while another guide hole has an elongated profile.

To greatly reduce the above mismatch problem, FIG. 7 shows top view of a female ferrule chip with modified guide holes, where one guide hole 704 is round while another guide hole 700 has an elongated profile in the direction 702. The round guide hole 704 serves as a position-defining hole, and the elongated guide hole 700 serves as a rotation-limiting hole.

This ferrule chip is useful as a female ferrule chip. A male ferrule chip should still have two round guide holes.

This design provides relief for the mismatch mentioned above, without reducing the alignment accuracy of the multi-fiber connector pair. The guide pins of the male multi-fiber connector ferrule can be inserted into the guide holes of the female multi-fiber connector ferrule even at a slight angle.

This design would have been very difficult to implement using plastic molding processes by which traditional MT ferrules are made. However, because of the microfabrication process disclosed here, arbitrary shaped guide holes can be formed at will, with great positional accuracy.

Alternate Recessed Fiber Connectors

Figure 8:
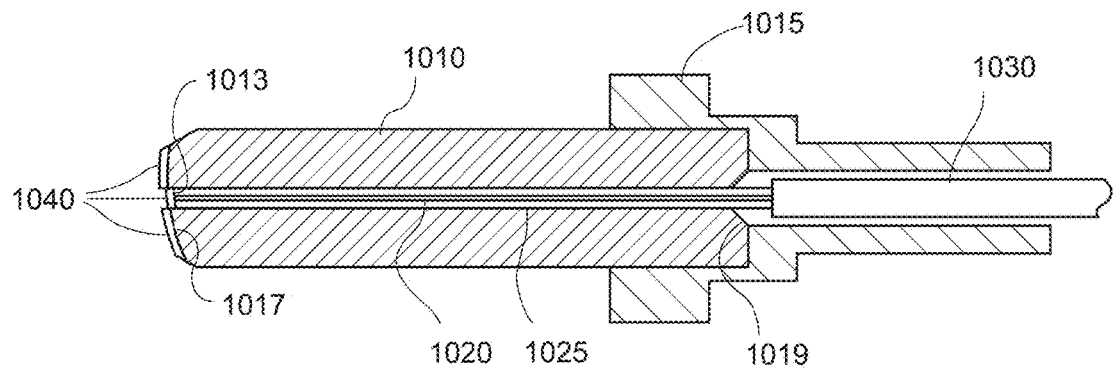
FIG. 8 is a cross sectional view showing a non-contact optical fiber connector component according to a further embodiment of the present invention.

With reference to FIG. 8, an embodiment of the non-contact optical fiber connector component according to the present invention is a non-contact fiber ferrule assembly for making non-contact optical fiber connectors. An optical fiber 1020 is permanently affixed in the axial through hole 1025 of a connector ferrule 1010 with epoxy, and a metal flange 1015 is connected to the ferrule 1010. The front surface of the ferrule 1017 forms a smooth polished, curved profile with the fiber surface 1013 somewhat offset from surface 1017. An AR coating 1040 is applied over the entire polished surface of the ferrule 1017 and the fiber facet 1013. The fiber 1020 can be any type of optical fiber. For example, it can be single mode fiber, multimode fiber, or polarization maintaining fiber.

Figure 9:
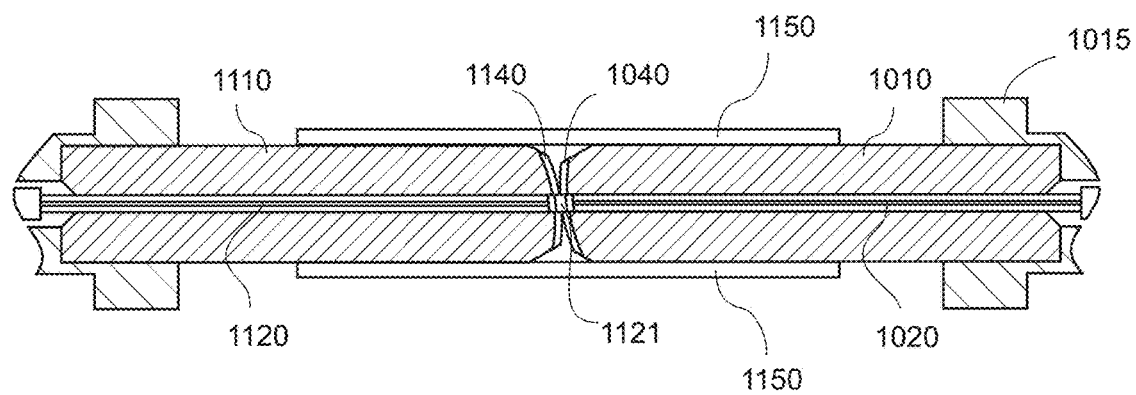
FIG. 9 shows a pair of such non-contact fiber connector components as shown in FIG. 8 mated together.

FIG. 9 shows a pair of such non-contact fiber connector components coupled together to complete a fiber connection with the aid of an alignment split sleeve 1150 found in a connector adapter. A conventional fiber connector adapter is used to align the two non-contact fiber connectors. The two ferrules 1010 and 1110 are shown precisely aligned by a split sleeve 1150 which sits at the center of a fiber connector adapter. A first fiber 1020 communicates light to a second fiber 1120 through a gap 1121 that exists between the two fibers by virtue of the fibers being slightly recessed. Thus, while the AR coatings 1040 and 1140 on the front surfaces of ferrules 10 and 1110 are in contact, the AR coatings on the fiber facets are not in contact. Therefore, this fiber optic connector is called a non-contact connector.

We now describe the non-contact fiber connector component in FIG. 8 in more detail, in the order of the manufacturing sequence. The non-contact optical fiber connector component of FIG. 8 includes a ferrule 1010 that is a conventional connector ceramic ferrule, typically a zirconia ceramic tube having a standard length and diameter. Most often the ferrule 1010 has a length on the order of 0.5 to 1.3 cm, and the diameter may be 2.5 mm or 1.25 mm. The ferrule 1010 has a polished front end 1017 and a rear end 1019. In turn, the rearward portion of ferrule 1010 is connected to a metal flange sleeve 1015, being permanently affixed to ferrule 1010 with a tight press fit. Glass fiber 1020 is inserted into the coaxial ferrule inner hole 1025 and permanently affixed by epoxy (not shown). Protected fiber cable 1030 is rearward of the ferrule 1010.

The fiber ferrule assemblies are then polished at the light output end so as to render a smooth surface 1017 on the ferrule 1010. The polish angle, measured as tilt from vertical at the fiber core, where vertical is perpendicular to the fiber axis, can be zero degrees, or non-zero degrees to minimize back reflection. In a preferred embodiment, the polish angle is 8 degrees. Just as in conventional fiber connectors where the connector ferrule surface is a convex surface, ferrule front surface 1017 should be convex as well.

Differential Polishing

The polishing process for non-contact fiber connectors in this invention is very similar to conventional connector polishing, except the final polishing step. After a fiber stub removal step, a series of progressively finer lapping films are used to polish the connector surface, typically from 9 microns, 3 microns, to 1 micron diamond particles. Final polish step is then performed.

The final polishing step in this invention is different from conventional connector polishing, and is the step responsible for forming the recess in the fiber. In this step, the fiber is preferentially and differentially polished relative to the ferrule front surface so as to create a recess between the fiber facet 1013 and ferrule front face 1017. The recess range should be kept as small as possible to reduce optical coupling loss, while ensuring no physical contact between the opposing fiber facets when mated.

For a single mode fiber SMF-28, the light beam is best described as a Gaussian beam. In air, the working distance (Rayleigh range) is about 100 microns. If the fiber recess is 0.5 micron, light from the fiber core traveling twice the recess length does not expand sufficiently to induce significant optical coupling loss. The extent of a recess is preferably in the range of 0.1 microns to several microns, more particularly, 0.1 micron to 0.5 micron, 0.1 to 1.0 micron, or 0.1 micron to 10 microns.

The recessed fiber facet 1013 in FIG. 8 can be created by polishing with flocked lapping films. These are lapping films with micro brushes which have abrasive particles embedded in them. For example, 3M flocked lapping film 591 can be used to create this recess. This is a lapping film with micro brushes which have 0.5 micron cerium oxide particles embedded in. Cerium oxide has a hardness very similar to that of the optical fiber but much softer than the zirconia ceramic ferrule 1010, and as a result, only the fiber surface 1013 is polished in this step. This step generates a very smooth optical fiber surface and typically is the last polishing step. The time in the final polishing step varies, and can be as short as 20 seconds. Polishing pressure in this final step should be kept lower than the previous polishing steps, in order to extend the lifetime of the flocked lapping film. Flocked lapping films with other polishing particles can be used as well, such as aluminum oxide or silicon nitride.

Finally, an AR coating 1040 is applied to the polished surface of the fiber 1013 and front surface of the ferrule 1017. The operating wavelength range of the AR coating determines the operating wavelength range of the non-contact optical fiber connector in this invention.

In a preferred embodiment, many polished fiber ferrule assemblies are loaded into a vacuum coating chamber and coated with a multi-layer stack of dielectric materials. Numerous AR coating processes can be used. For example, the coating method can be ion beam sputtering or ion-assisted e-beam deposition. Care should be taken to prevent significant amount of the coating material from getting on the sidewall of the ferrule cylindrical surface, by suitable masking. Otherwise, the material will alter the precision diameter of the ferrule, and cause flaking off of coating material which will affect connector performance.

The fiber cables to be coated in an AR coating chamber must not outgas significantly in a vacuum chamber. We have observed that the inclusion of a mere ten 0.9 mm loose tube buffered cables in the chamber can lengthen the vacuum pumping time from 2 hours to more than ten hours for ion beam sputtering. The materials of the fiber cable must be chosen carefully to reduce outgassing. Bare fibers housed in ferrules in the AR coating chamber are optimal.

Figure 10:
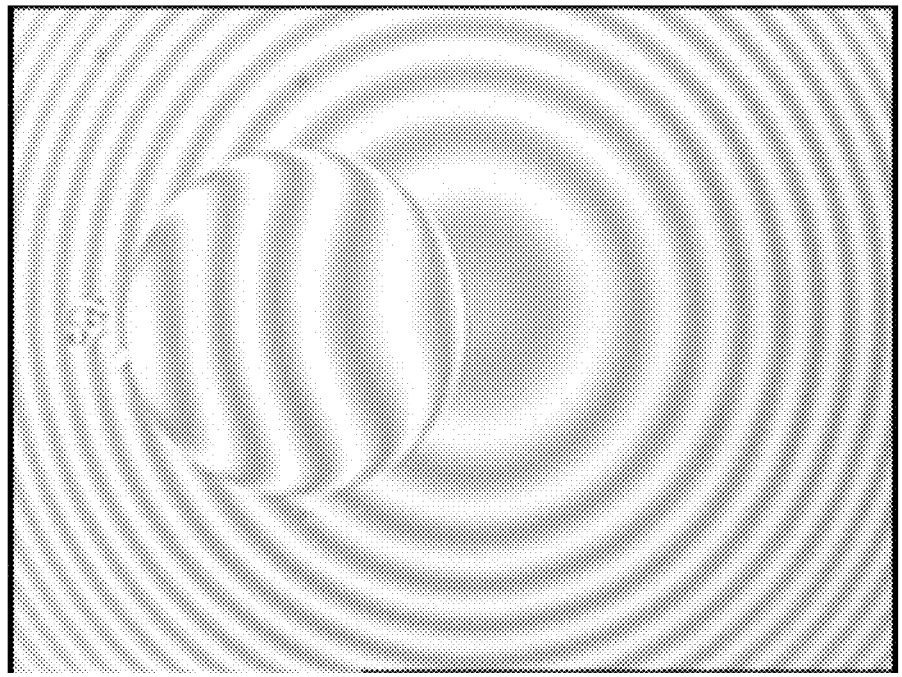
FIGS. 10(A) and 10(B) are contour plots of the recessed fiber surfaces of the non-contact optical fiber connector, as measured by a commercial fiber optic interferometer.
Figure 10:
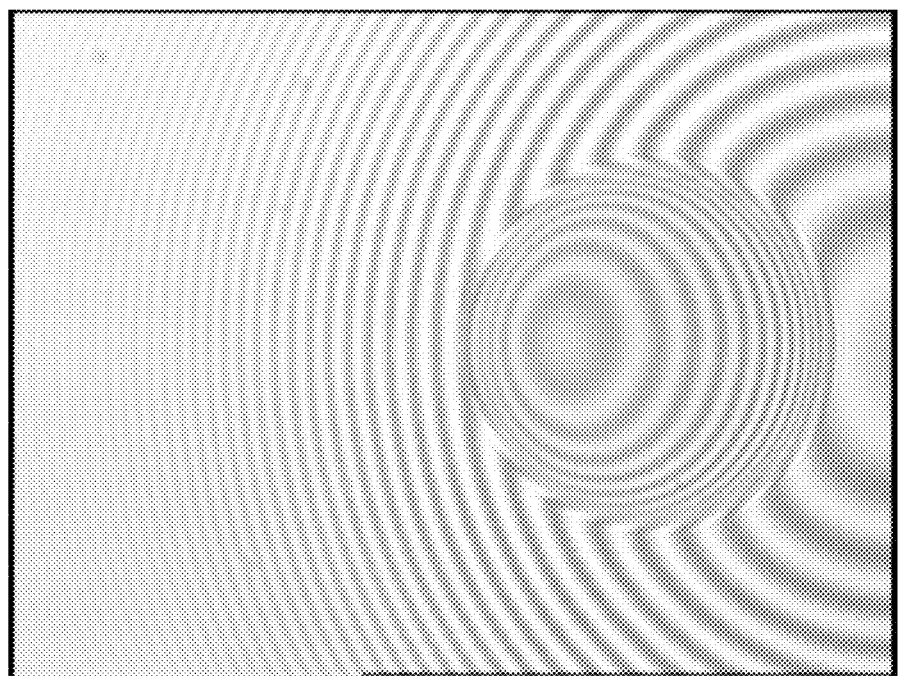

FIGS. 10(A) and 10(B) are contour plots of the recessed fiber surfaces of the non-contact fiber connector, polished by a 0.5 micron cerium oxide flocked lapping film, as measured by a commercial fiber optic interferometer. To show the recessed fiber surface, the connector surface was tilted intentionally in order to show continuous height contours. Different amounts of polishing time were used in these two cases. The depth of fiber recess in the plots was estimated to be 0.5 micron and 2.8 micron respectively. Some curvature on the fiber surface center can be seen from these two plots, but the amount of curvature is not large enough to significantly alter light beam propagation between the recessed fiber facets.

We have polished more than 500 non-contact fiber connectors with zero scratches, which is very different from the final polish step of conventional connectors where scratches are frequent and inspection and repolishing are required. As a result, 100% inspection of connector polishing after final polish step becomes unnecessary which can save significant manual labor cost.

Non-Contact Fiber Connector Performance

Several hundred non-contact fiber connectors with recessed fiber facets have been made to date with great manufacturing yield. Both zero degree and 8° angled non-contact (ANC) single mode fiber connectors were made.

The insertion loss of both zero degree and 8° ANC connectors shows nearly identical loss distribution to that of conventional fiber connectors, for example with a range of 0-0.2 dB insertion loss. The insertion loss in all three cases is dominated by the errors in the fiber core positions due to geometrical tolerances.

A mated pair of zero degree NC connectors has about 30 dB return loss, while a mated pair of 8 degree ANC connectors has more than 70 dB return loss, or about 10 dB higher return loss than conventional 8 degree APC connectors.

Both NC and ANC connectors have essentially guaranteed insertion loss performance in random mating. Therefore, an ANC connector is the preferred connector because it has superior return loss performance.

We have tested a pair of ANC connectors and found it lasted through 10,000 matings with less than 0.01 dB insertion loss change from the beginning of the test to the end.

The non-contact fiber connector of the type shown in FIG. 8 greatly improves the optical performance and the durability of the fiber connector and meets the needs of most applications.

Figure 11:
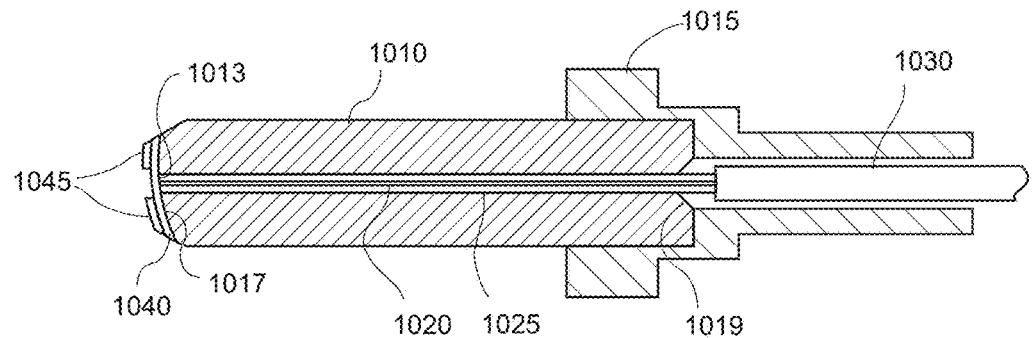
FIG. 11 is a cross sectional view showing another embodiment of the non-contact optical fiber connector component according to the present invention.

FIG. 11 is a cross sectional view showing another embodiment of the non-contact optical fiber connector component according to the present invention. Another means for providing a recess of the fiber facet relative to the ferrule front surface is to coat the ferrule surface selectively with a metal coating 1045 as a spacer layer on top of the AR coating layer 1040. Metal coatings having a thickness of from a fraction of a micron to a few microns (for example 10 micron) may be applied by vapor deposition or ion beam sputtering using techniques known in the semiconductor industry. Such coatings are known to be resistant to wear and tear.

In this embodiment, the fiber ferrule assembly can be polished using a conventional connector polishing process. The result of this polishing process is that the fiber is at the apex of the convex surface. The polishing angle can be zero degrees or 8 degrees. The metal coating can be accomplished by a suitable masking operation so that the metal does not cover the fiber surface. Note that the AR coating 1040 covers both the output facet 1013 of the fiber 1020 and the front surface 1017 of ferrule 1010.

In conventional connector cables, frequently a long length of reinforced fiber cable is used between two optical fiber connectors. For example, one of the most used fiber cables is a 3 mm diameter cable with Kevlar fabric reinforcement. Such a cable will outgas greatly in a vacuum chamber, occupy too much room and difficult to manage inside the AR coating chamber. Clearly AR coating entire reinforced fiber connector cables in an AR coating chamber is not an option. It is viable to do AR coating on not-reinforced entire fiber connector cables. Not-reinforced fiber cable may be bare fiber cables or 0.9 mm tight buffer fiber cables, for example.

Instead, only the most essential part of the connector with very short length fiber should be loaded in. After AR coating, such short fiber should be connected to the long reinforced cable by fusion splicing, which is a very reliable and relatively low cost fiber connection method.

Splice-on connectors are known in the prior art. These are conventional connectors that have factory-polished connector surfaces with a short length of cleaved fiber at the rear of the connector head ready for fusion splicing to a long length of typically reinforced fiber cable.

Figure 12:
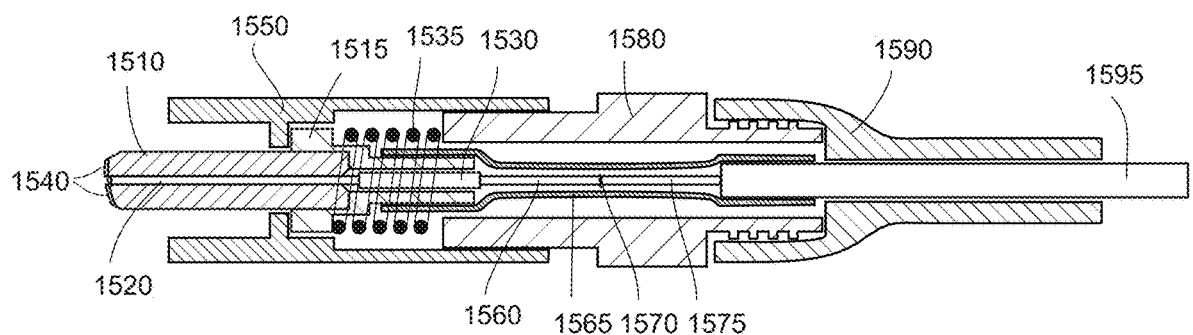
FIG. 12 is a schematic drawing of a generic non-contact optical fiber connector with a splice-on connector construction.

FIG. 12 is a schematic drawing of a generic non-contact optical fiber connector with a splice-on connector construction. This construction is a necessary part of the low cost mass production process, because it allows non-contact fiber connectors to have very long fiber cables and reinforced fiber cables. The splice-on structure of the coupling device also allows non-contact fiber connectors to be installed in the field.

In FIG. 12, a non-contact fiber ferrule assembly is housed in a connector structure, which comprises a housing 1550, a spring 1535, a main body 1580, a rubber boot 1590. The spring 1535 provides positive force to the fiber ferrule 1510, which has a fiber 1520 inside its through hole. An AR coating 1540 is at the front surface of the fiber ferrule assembly and covers the fiber facet. The fiber at the rear of the fiber ferrule 1510 has a protected bare fiber section 1530. It is stripped and cleaved to expose a glass fiber section 1560. A long fiber cable 1595 is stripped and cleaved to expose a glass fiber section 1575. These two glass fiber sections are fusion spliced together at fusion splicing joint 1570. The glass fiber sections should be as short as possible, so that the splice-on connector is not too bulky. Each glass fiber section is preferably 5 mm in length. Because the fusion spliced joint is very weak, it is reinforced by a conventional fusion splicing protection sleeve 1565, which is attached at one end of the metal flange 1515 and at the other end to long cable 1595. There is a steel rod inside the protection sleeve to give it strength.

Figure 13:
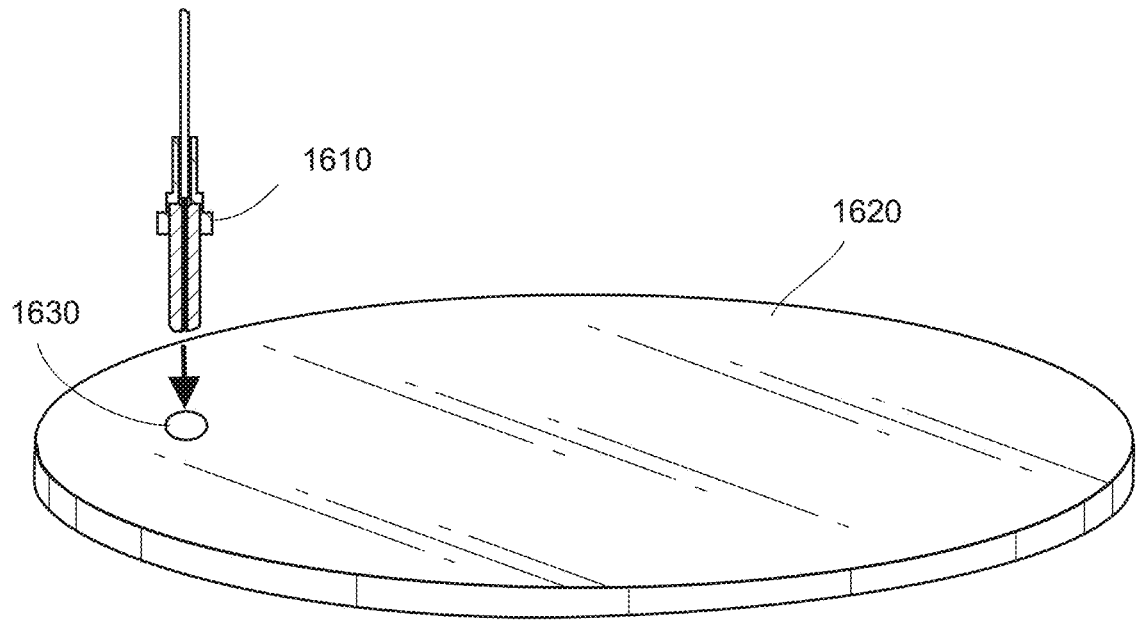
FIG. 13 is a schematic drawing of a sample holder for AR coating many non-contact fiber connector components of the type in FIG. 8 simultaneously.

FIG. 13 is a schematic drawing of a sample holder 1620 for AR coating a very large number of fiber ferrule assemblies simultaneously. The holder 1620 is machined with many closely spaced, ferrule sized holes 1630 so that a large number of fully polished fiber ferrule assemblies 1610 of the type depicted in FIG. 8, without the AR coating, may fit in. Thousands of such assemblies can be AR coated in the same coating run using such a holder 1620 to reduce manufacturing cost.

Figure 14:
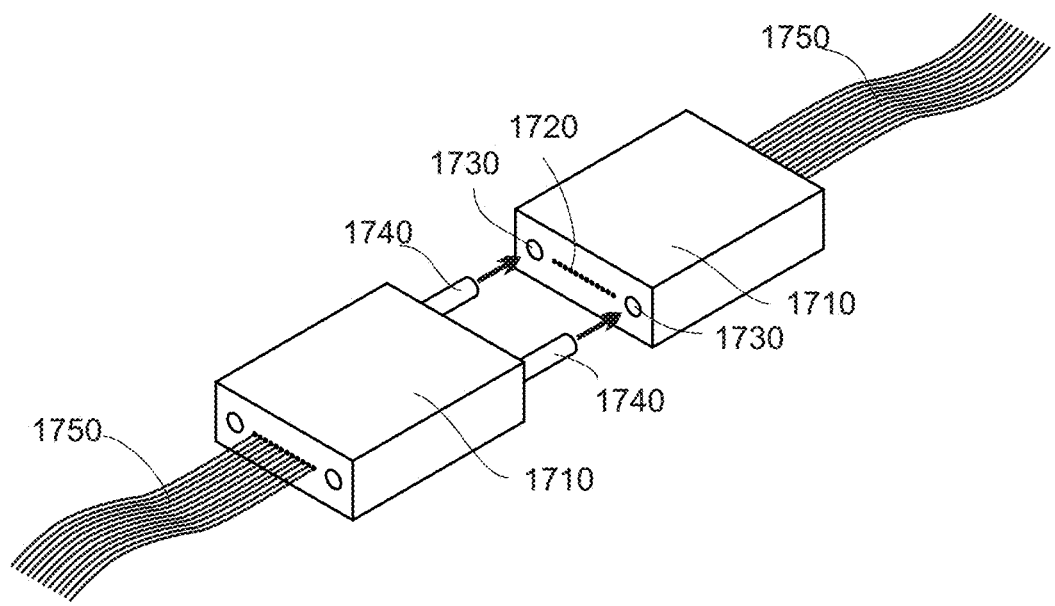
FIG. 14 is a plan view of a non-contact multi-fiber connector pair according to an embodiment of this invention.

The non-contact fiber connector operating principle established above can be used for multi-fiber connectors as well, such as MT type array connectors. FIG. 14 is a plan view of a non-contact multi-fiber connector pair according to an embodiment of this invention. A plurality of optical fibers 1750 (also known as ribbon fiber) are permanently affixed in the axial through holes of the multi-fiber connector ferrule block 1710 with epoxy. The front surface of the ferrule block 1710 forms a smooth polished profile with the fiber facets 1720 recessed. An AR coating is applied over the entire polished front surface of the ferrule block 1710 and the fiber facets 1720.

When a multi-fiber connection is made using two non-contact multi-fiber connectors as in FIG. 14, two guide pins 1740 go through one ferrule block 1710 and enter the precisely formed guide holes 1730 of the opposing ferrule block to align the two multi-fiber connectors. The polished front surfaces of the two multi-fiber connectors must make contact due to the springs in the connectors (not shown). A latch, not shown, holds the two ferrule blocks 1710 together. Due to the fiber facets being recessed, the fiber facets do not touch, resulting in reliable and long lasting operation of the non-contact multi-fiber connector.

Fiber facets 1720 can be offset from ferrule block front surface by a number of means. Selective etching, differential polishing, metal deposition, or simply deforming the polished ferrule surface can all achieve non-contact of fiber facets. In all cases, small gaps between facing fibers can communicate optical signals from fiber cables to mating cables. The facets can have a slight angle, say 8 degrees.

It will be appreciated by those skilled in the art, in view of these teachings, that alternative embodiments may be implemented without deviating from the spirit or scope of the invention, as set forth in the appended claims. This invention is to be limited only by the following claims, which include all such embodiments and modifications when viewed in conjunction with the above specification and accompanying drawings.

The invention claimed is:

1. A method for making a recessed fiber, non-contact, optical connector at an end of an optical fiber cable, the optical connector configured to removably mate the optical fiber cable to another device, the recessed fiber non-contact, optical connector having at least one optical fiber positioned in a ferrule, the method comprising:
    providing an optical fiber ferrule;
    inserting one or more optical fibers in one or more through-holes in the ferrule, the ferrule having a ferrule front surface, each through-hole being sized to accept and align an optical fiber, the one or more optical fibers being part of an optical fiber cable that does not significantly outgas in a vacuum deposition chamber;
    affixing the one or more optical fibers in the ferrule to form a fiber-ferrule-cable assembly;
    applying a multi-layer dielectric antireflection coating using a method selected from ion beam sputtering or ion-assisted e-beam deposition under a vacuum deposition condition to the recessed fiber facet and to the ferrule contact surface;
    selectively applying a coating as a spacer layer on top of the multi-layer dielectric antireflection coating positioned on the ferrule such that a recess is formed between a top surface of the coating spacer layer and an end surface of the one or more optical fibers positioned in the ferrule.

2. The method according to claim 1, where the spacer layer is a metal layer.

3. The method according to claim 1, wherein the metal layer is applied by vapor deposition or ion beam sputtering.

4. The method according to claim 1, wherein the thickness of the spacer layer is up to 10 microns.

5. The recessed fiber, non-contact, optical connector at an end of an optical fiber cable according to claim 1.

6. A method for making a recessed fiber, non-contact, optical connector at an end of an optical fiber cable, the recessed fiber non-contact, optical connector having at least one optical fiber positioned in a ferrule, the method comprising:
    providing an optical fiber ferrule;
    one or more optical fibers in one or more through-holes in said ferrule, the ferrule having a ferrule front contact surface, each through-hole being sized to accept and align an optical fiber, each of said one or more optical fibers being part of an optical fiber cable that does not significantly outgas in a vacuum deposition chamber;
    affixing said one or more optical fibers in said ferrule to form a fiber-ferrule-cable assembly;
    performing differential polishing of said fiber-ferrule-cable assembly such that a smooth fiber facet and ferrule front contact surface are formed, and said fiber facet is recessed from said ferrule front contact surface by an amount of 0.1 micron to 10 microns;
    applying a multi-layer dielectric antireflection coating under a vacuum deposition condition to said recessed fiber facet and to said ferrule front contact surface such that contact with a mating optical fiber connector contacts the multi-layer dielectric antireflection coating on the ferrule front contact surface.

7. The recessed fiber, non-contact, optical connector formed according to claim 6.

8. A recessed fiber, non-contact, multi-fiber optical connector at an end of an optical fiber cable, the recessed fiber non-contact, multi-fiber optical connector having plural optical fibers positioned in a ferrule block, the recessed fiber non-contact, multi-fiber optical connector at the end of an optical fiber cable being fabricated by:
    providing an optical fiber ferrule block, the ferrule block including guide pins or guide holes to align multi-fiber connectors;
    inserting plural optical fibers in separate through-holes in the ferrule block, the ferrule block having a ferrule block front surface, each through-hole being sized to accept and align an optical fiber, each of the plural optical fibers being part of a multi-fiber optical fiber cable that does not significantly outgas in a vacuum deposition chamber;
    affixing the plural optical fibers in the ferrule to form a fiber-ferrule-cable assembly;
    performing differential polishing of the plural optical fibers and the ferrule block front surface, so that a smooth fiber facet and ferrule block contact surface are formed, and a recess between a fiber facet and the ferrule block contact surface is formed such that the created recess ranges from 0.1 micron to 10 microns;

applying a multi-layer dielectric antireflection coating using a method selected from ion beam sputtering or ion-assisted e-beam deposition under a vacuum deposition condition to the recessed fiber facet and to the ferrule block contact surface such that the multi-layer dielectric antireflection coating, after application, is a two-level antireflection coating having a first coating level on the front surface of the ferrule block and a second coating level on the polished surface of the plural optical fibers, the first coating level being higher than the second coating level such that when the first coating level multi-layer dielectric antireflection coating on the front surface of the ferrule block contacts another ferrule block during connector mating, the second coating level on the plural optical fibers does not contact mating fibers to form a multi-fiber non-contact optical connector.

\* \* \* \* \*